Aug. 1, 1939.　　　　E. R. BURTNETT　　　　2,167,873
AUTOMATIC CHANGE SPEED TRANSMISSION
Filed Sept. 27, 1937　　　2 Sheets-Sheet 2
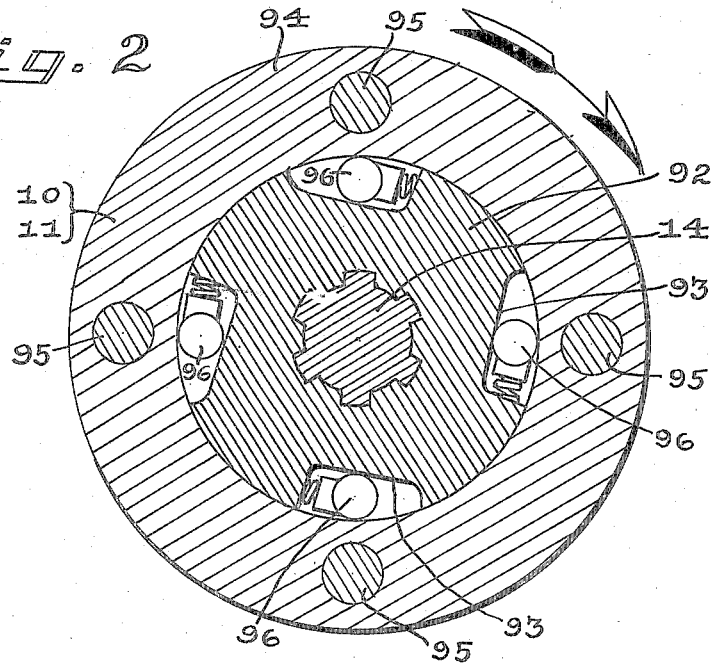
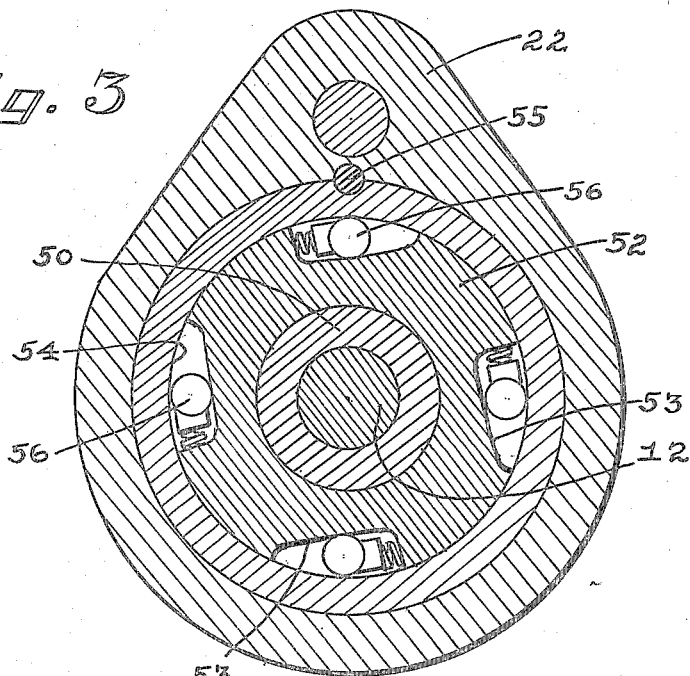
INVENTOR
Everett R. Burtnett Patented Aug. 1, 1939

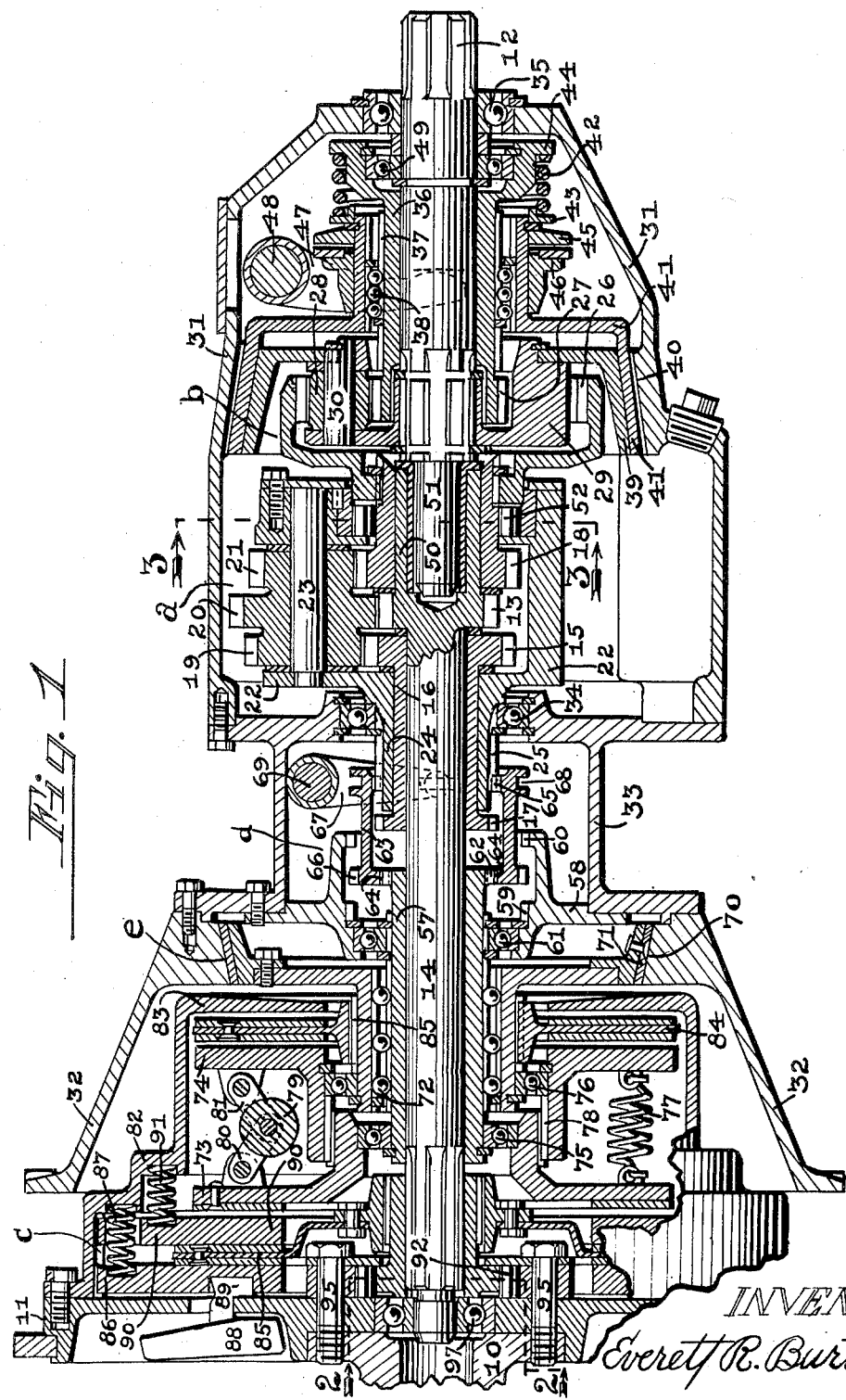

2,167,873

UNITED STATES PATENT OFFICE 2,167,873

AUTOMATIC CHANGE SPEED TRANSMISSION

Everett R. Burtnett, Los Angeles, Calif., assignor of one-third to Edith Glynn Burtnett, Los Angeles, Calif.

Application September 27, 1937, Serial No. 165,927

53 Claims. (Cl. 74—260)

My invention relates to variable speed power transmitting mechanism and more particularly to an automatic change speed transmission especially adapted for use in motor vehicles.

A principal object of my invention is to provide a change speed transmission having a plurality of joint operating distinct multi-speed transmitting units each for distinct speed ratio of drive control and to provide speed responsive automatic control over at least one of the distinct multi-speed transmitting units with a suitable form of distinct control over another of the multi-speed transmitting units whereby a wide range of speed ratios of drive may be obtained partially under control of the operator.

Another object of my invention is to provide a wholly mechanical combined automatic and optional control change speed transmission wherein each different speed ratio is positive to give two-way drive, which when used in motor vehicles provides for use of the engine compression as a brake against the vehicle momentum in either of a wide range of different speed ratios.

Another object of my invention is to provide a wholly mechanical and comparatively inexpensive automatic change speed transmission which may be optionally permanently established in a positive two-way driving speed reducing gear drive.

Still another object of my invention is to provide an automatic change speed transmission to drive between driving and driven members at different speed ratios employing speed responsive means for coupling the driving member to drive the transmission and provided with means whereby the driving member can be rotated to start the prime mover under momentum of the load through the transmission notwithstanding the inoperative state of the speed responsive means normally depended upon to connect the driving member and transmission.

Still another object of the present invention is to provide a speed responsive means controlled change speed transmission having a normally but yieldingly engaged unit of frictionally-engaging elements operating to normally render a gear train of the transmission gear drive operative and provided with speed responsive automatic means for disengaging the frictionally-engaging elements normally rendering the gear drive operative and to speed responsively subsequently complete the driving connections of another speed ratio, whereby the normally operative speed ratio of drive may be a positive two-way drive and the automatic supplanting speed ratio of drive may also be a positive two-way drive.

Still another object of my invention is to provide an automatic change speed transmission for driving the load carrying driven member at different forward driving speed ratios which while pre-selected for forward driving will afford an automatic but optionally releasable "no-back" against the load carrying driven member rotating backwards.

Still another object of my invention is to provide a variable speed planetary gear unit with a normally but yieldingly engaged brake unit of frictionally-engaging elements rendering its low speed ratio operative as a two-way driving gear train, and to provide a centrifugal automatic clutch mechanism to change the planetary gear unit to a two-way drive high speed ratio, the singular retractive spring provision of which speed changing centrifugal clutch will also operate as the sole medium to energize engagement of the gear drive effective brake means of the planetary gear unit, whereby the centrifugal actuations of the high speed ratio effecting clutch will cause the release of the brake unit engaging spring tension and consequently the brake itself.

And still another object of my invention is to provide a speed responsive automatic drive coupling means operated change speed transmission wherein the drive in any speed ratio may be optionally opened while the speed responsive means couplings are maintained in effect to obtain a neutral transmission, by the use of distinct differentially engageable and disengageable frictionally-engaging elements also contributory to change speed control, but independent of the speed responsive automatic drive coupling means.

Other objects and advantages of my invention will appear in the appending specification and claims.

In the drawings:

Figure 1 is a vertical longitudinal central section taken through a transmission constructed in accordance with my present invention and designed more particularly for use in motor vehicles.

Figure 2 is a vertical transverse sectional view taken on line 2—2 of Fig. 1, showing the driving one-way or overrunning clutch feature of my invention as viewed from the front as indicated by the arrows.

Figure 3 is a vertical transverse sectional view taken on line 3—3 of Fig. 1, showing the overrunning clutch which renders the transmission operative, when selected for forward driving of the load carrying driven member, to prevent backward rotation of the driven member. The direction of this view is also indicated by the arrows.

Referring to the drawings, 10 indicates a driving member usually constituting the engine driven crankshaft in a motor vehicle transmission. The usual engine flywheel secured to the engine shaft or driving member is indicated at 11. A driven member 12 for positive connection to drive or to be driven from the vehicle's driving wheels is shown as the final driven member of the change speed transmission.

Two distinct multi-speed gearsets, in the present design shown as two distinct planetary type gear units, are indicated at $a$ and $b$.

The fast or normal driving unit $a$ of these two distinct multi-speed planetary gear units comprises a low speed sun drive gear 13 having an integral main clutch or driving shaft portion 14 extending into the usual clutch shaft pilot bearing mounting in the usual recessed pocket in the engine driven driving member 10. This main clutch shaft being adapted to operate as a driving element to the low speed ratio of the front distinct multi-speed gear unit $a$. A larger drive sun gear 15 having a comparatively short forwardly extending integral shaft portion 16 with clutch jaws 17 formed at the forward end of the shaft extension 16. A driven sun gear 18. A layshaft cluster of three planet gears comprising a first cluster gear 19 in mesh with the larger sun drive gear 15 and a second cluster gear 20 in mesh with the low speed or smaller sun drive gear 13 and a third cluster gear 21 in mesh with the driven sun gear 18. And a planet carrier 22 supporting a layshaft arbor 23 upon which the planet cluster of gears 19, 20 and 21 is mounted free to rotate around their own axis and having a forwardly extending hub or shaft portion 24 the periphery of which is splined to form clutch teeth 25. The planet carrier 22 of this construction of the multi-speed planetary gear unit forms the pivotal element adapted to be held from rotating to render the sun drive, planet cluster and driven sun gears operative to transmit rotation.

The second or normally driven unit $b$ of the two-distinct multi-speed planetary gear units comprises an internal drive gear 26 connected to rotate with the sun driven gear 18 of the first distinct planetary gear unit $a$; a sun pivotal gear 27 adapted to be held from rotating to render the second planetary gear unit operative to transmit gear drive rotation; a planet gear 28 between and mashing with both the internal drive gear 26 and the sun pivotal gear 27; and a planet carrier 29 having an arbor 30 upon which the planet gear 28 is mounted free to rotate around its own axis.

A gearbox or housing 31 encloses the two distinct multi-speed planetary gear units $a$ and $b$ in a single compartment and a clutch bell housing 32 is detachably secured to a forwardly extending neck or reduced size portion 33 of the gearbox 32. A main bearing 34 mounted in the forward end wall of the gearbox 32 carries the pivotal element 22 of the first multi-speed planetary gear unit $a$ and another main bearing 35 mounted in the rear wall of the gearbox 32 carries the driven member or tail shaft 12. Preferably the gearbox 32 proper is made separate and detachable from the front wall of the gearbox, the latter preferably being an integral end wall of the neck portion 33.

To render the second planetary gear unit $b$ distinctly controllable to either gear drive operate to drive the driven member 12 or operative to rotate as a unit for direct drive coupling operation to drive the driven member 12 a sleeve shaft extension 36 encircles the driven member 12 rearwardly and is splined as indicated at 37 to receive anti-friction instrumentalities 38. A direct drive engageable clutch cone 39 is secured to the planet carrier 29. A gear drive effective engageable brake cone 40 is formed in the gearbox 32. And a longitudinally shiftable engaging cone 41 is mounted non-relatively rotatable with, but for free longitudinal movement relative to, the sun pivotal gear 27 through the medium of the instrumentalities 38.

To normally but yieldingly energize the shiftable engaging cone 41 into engagement with the clutch cone 39, a spring 42 is compressed between flanged portions 43 and 44, respectively, formed on the shiftable cone 41 and the sun pivotal member 36. This relation establishes the second multi-speed planetary gear unit $b$ normally operative as a direct drive coupling to the driven member 12. And to optionally open this direct drive coupling by movement of the shiftable cone 41 rearwardly, but not into engagement with the brake cone 40, to neutralize the drive at the second or driven planetary gear unit $b$. Or to change the respective planetary gear unit from direct drive to a gear drive operating state. An engageable thrust plate 45 is secured to the rearward end of the shiftable cone 41 and an engaging mate thrust plate 46 (preferably including a carbon friction contact surface) is arranged in encircling and relatively rotatable relation to the hub portion of the shiftable cone 41 for engagement to force the latter rearwardly either into a neutral position or into an engaged relation with the brake cone 40. A bifurcated yoke 47 is mounted on a transverse shaft 48 forming means to actuate the engaging thrust plate 46. In the present invention the usual clutch pedal (not shown) is preferably retained and brought into connection with and to actuate the shaft 48 and arm 47. For it is this rear friction unit in the present invention that affords the customary declutching and opening of the preselected drive that drivers are accustomed to effecting without shifting "out of gear". Hence the practical adaptation of the customary clutch pedal to control the effective speed ratio of drive and optional opening of the second or driven distinct multi-speed planetary gear unit $b$.

To resist any end thrust either from the spiral gear teeth of the sun pivotal gear 27 or from the compressed spring 42, I provide a combined radial and end thrust ball bearing 49 locked in position on the driven member 12 and within the bore of the extension 36 of the sun pivotal gear 27.

A rearwardly extending sleeve portion 50 of the low speed sun drive gear 13 of the first planetary gear unit $a$ accommodates the spigot journalling of the forward end 51 of the driven member 12 therein and provides a rigid spindle mounting for the driven sun gear 18 of the first planetary gear unit $a$ for relative rotation on the periphery of the said rearwardly extension 50 of the sun drive gear of the same planetary gear unit.

That any tendency of the driven member 12 to rotate backwards (anti-clock from the front) will be transmitted or urged upon the pivotal or planet carrier element 22 of the first, front or normal driving multi-speed gear unit $a$, I provide and arrange an overrunning clutch 52 between and to drive the pivotal element 22 backwards from the connecting embodiment comprising the driving internal gear 26 of the rear planetary gear unit and the driven gear 18 of the front planetary gear unit. With respect to the overrunning clutch 52 functioning as described, it will be obvious that the normal engagement of cones 41 and 31 will normally operate to render the planetary gear unit $b$ a drive effective medium between the driven member 12 and the overrunning clutch 52. The overrunning clutch 52 is a contributing element to the automatic "no-back" ability of the present rotation transmitting invention.

Referring to Fig. 3, the overrunning clutch 52 is found to comprise backward rotation driving cams 53 to rotate with the internal gear element 26 of the rear planetary gear unit $b$. An annulus 54 locked by a pin 55 to rotate with the pivotal element 22 of the front planetary gear unit $a$. And roller clutch members 56 between and contacting the cams 53 and the annulus 54.

It is pointed out that any tendency of the driven member 12 to rotate forwardly, and reaching the individual driven member 18 of the front or driving planetary gear unit $a$ through the medium of the gear unit $b$, will have a tendency to urge the planet gears 21 and 20 to rotate backward and in turn urge the forward rotative effort of the member 18 upon the drive gear 13. It will be seen that the differential in sizes of the gear members mentioned, i. e., making up this train effected, would promote a tendency of the planet carrier or pivotal element 22 of the gear unit $a$ to rotate forwardly rather than gear function of the gear unit $a$ to rotate the drive gears 13 forwardly. Forward rotative tendency of the pivotal or carrier element 22, carrying the annulus 54 of the one-way clutch 52 forwardly with it under this reaction, would, it will be seen, tend to wedge the roller clutch members 56 against their cams 53. Now therefore, since the cams 53 are rotatable with the driven member 18, which latter is tending to rotate forwardly under the influence of the driven member 12, the elements of the planetary gear unit $a$ would become locked by the one-way clutch 52 to rotate as a unit forwardly, thus tending to render the gear unit $a$ automatically operable to transmit forward rotative efforts from its normally driven member 18 to its normally driving member 13. An automatic means is thus provided by which the planetary gearing between members 13 and 12, respectively, representing drive and driven members is operable to transmit rotative efforts in one direction from the drive member 12 to the drive member 13.

One object for adoption of the particular form of the driving multi-speed gear unit $a$, resides in the plurality of sun drive gears, the larger of which may be held from rotation to promote a reverse of drive between the smaller sun drive gear 13 and the driven gear 18 through the planet cluster gears 20 and 21. Another object resides in the mechanical advantage of the two-step speed reduction as obtained through the first pair of gears 13 and 20 and the second pair of gears 21 and 18.

An object for the adoption of the particular form of the driven distinct multi-speed gear unit $b$, resides in its natural giving of a slight reduction of speed when gear driving which may be distinctly brought into play as a third speed or low-high ratio of drive while the forward distinct multi-speed gear unit $a$ is operating in direct drive. Another object is its lending to simple means of control either to relate same to gear drive operate or to relate same to rotate as a unit to give a direct drive coupling effect in transmitting rotation. The coordination of the adopted two particular forms of joint operating multi-speed planetary gear units give four forward speeds and two reverse speeds without requiring a distinct unit of gearing for the purpose of obtaining forward, neutral and reverse. Aside from this they cooperate to give other advantages deemed otherwise unobtainable. Thus I have described in detail the multi-speed gearing and output control means of my present invention.

In a motor vehicle transmission it is desirable to leave the driver in some degree of control over the speed ratios. In the present transmission, this is provided for at the output distinct multi-speed gears unit $b$ and its distinct control unit of inter-engageable elements 39, 40 and 41, over which any suitable means of, either power means over which the driver holds control or of direct manual means to be actuated by the driver. This leaves the driving distinct multi-speed gear unit $a$ to be initial drive coupled and speed change automatically controlled and to this end the invention contemplates further the provision of two stage engaging or compounding speed responsive automatic clutch mechanism indicated at $c$ for completing different speed ratios of drive operating connections between the driving member 10 and the first distinct multi-speed gearset $a$.

Since the driven or power output multi-speed gearset $b$ is normally established in direct drive coupling relation to drive or to be driven from the final driven or tail shaft 12 by virtue of the spring 42 acting to normally hold the engaging cone 41 in clutch engagement with the engageable clutch cone 39, some means must obviously be provided to permanently establish the transmission in neutral which may be termed a "fixed" neutral. To this end and also for establishing the first distinct multi-speed gearset $a$ either permanently operative as a positive two-way gear drive transmitting medium or as a reverse drive medium I provide a selective jaw clutch intermediary drive coupling unit indicated at $d$ comprising a high speed ratio sub-clutch or sleeve-shaped shaft element 57 arranged rotatively free in encircling relation to the main clutch shaft or low speed ratio driving element 14 to the first multi-speed gear unit $a$. An intermediate wall 58 of the gearbox-clutch bell housing embodiment of portions 31 and 32 forming a stationary clutch member has reverse selectable jaws 59 and permanent positive gear drive effective selectable clutch jaws 60 and carries a combined radial and end thrust load taking anti-friction bearing 61, which bearing in turn carries the high speed ratio sleeve shaft 57 so the latter is positively prevented from moving axially. Clutch jaws 62 are formed on the rearward end of the high speed ratio driving clutch shaft or driving element 57 to the first multi-speed gear unit $a$. A shiftable clutch member 63 has high speed ratio of drive connecting clutch jaws 64 and 65, respectively, for automatic-change speed-forward drive establishment engagement with the driving clutch jaws 62 and the driven clutch jaws 25 of the pivotal element 22 of the first planetary gear unit $a$. This clutch member 63 also has clutch jaws 66 to be engaged with the stationary clutch jaws 59 after the clutch jaws 65 of the clutch member 63 are shifted forwardly out of engagement with the jaws 25 and said clutch jaws 66 are simultaneously brought into engagement with the jaws 17 of the larger sun drive gear 16 of the first planetary gear unit a to establish the respective gear unit in a reverse drive operating state. An additional function of the shiftable jaw clutch member 63 is to be shifted rearwardly taking its clutch jaws 64 out of engagement with clutch jaws 62 and bringing said clutch jaws 64 into engagement with the other stationary clutch jaws 60 while the clutch jaws 65 of the shiftable clutch member 63 are maintained in engagement with the splines or jaws 25 of the pivotal element 22 of the first multi-speed planetary gear unit a for establishing the latter operative in a permanent and positive two-way gear driving state. Shifting of the clutch member 63 one step forwardly, from the position of "forward drive for automatic change of speed" in which it is shown, taking the clutch jaws 64 out of engagement with clutch jaws 62 and taking the clutch jaws 65 out of engagement with jaws 25 without bringing clutch jaws 66 into engagement with the reverse drive effective stationary jaws 59, establishes the transmission in neutral. And shifting the clutch member 63 one step rearwardly, from the position of "forward drive for automatic change of speed" in which it is shown, taking the clutch jaws 64 out of engagement with jaws 62, while maintaining the clutch jaws 65 in engagement with jaws 25, but without bringing the clutch jaws 66 into engagement bringing the clutch jaws 66 into engagement effecting stationary clutch jaws 60, also establishes the transmission in neutral. Hence a progressive shift of the clutch member 63 forwardly from a middle position of "forward drive for automatic change of speeds" would first give "neutral" and thereafter "reverse" operations; and a progressive shift of the clutch member 63 from the position shown being that of "forward drive for automatic change of speed" would first give "neutral" and thereafter "permanent positive gear", operations. A bifurcated yoke 67 engaging a groove 68 in the clutch member 63 and carried by a transverse shaft 69 provides the means for shifting the clutch member 63 differentially with respect to clutch engagements and disengagements, as described. Thus I have described in detail the positive jaw clutch means provision in my invention for preselecting either "neutral", "forward drive for automatic change of speed", reverse or permanent positive gear drive.

It will be noted that preselected in "forward drive for automatic change of speed", (as shown) that the "high speed ratio drive" sleeve shaft driving element 57 is locked by the clutch member 63 through engaged jaws 62 and 64 and engaged jaws 65 and 25 to the pivotal element 22 of the first multi-speed planetary gear unit a. In this connection I provide a normally but yieldingly engaged unit of frictionally-engaging brake elements indicated at e normally holding the sleeve shaft 57 and the preselectively but optionally declutchable pivotal element 22 from rotating. By this means the first distinct planetary gear unit a is initially related to give a positive two-way gear drive operation between the sun drive and driven gears 13 and 18 thereof. This brake unit e comprises a stationary frictionally-engageable element 70 preferably in the form of a cone formed in the clutch bell housing 32, and a longitudinally movable mate frictionally-engaging brake element 71 mounted non-rotatably on, but for free longitudinal movement relative to, the sleeve shaft 57 by means of anti-friction instrumentalities 72. A pair of normally but yieldingly longitudinally retracted secondary driven clutch members 73 and 74, respectively, mounted by means of combined radial and end thrust load taking bearings 75 and 76, respectively, longitudinally fixed to the main clutch shaft 14 and to the longitudinally movable engaging brake element 71, provide an expandible means normally pulled toward each other by means of a retractive spring element 77, by which through the medium of the end thrust bearings 75 and 76 the longitudinally movable engaging brake element 71 is normally energized forwardly into engagement with its mate stationary brake cone 70. This urge upon the brake cone 71 is caused by virtue of the bearing 61 preventing longitudinal movement of the spring pulled member 73 and sleeve shaft 57, joined as they are into a fixed longitudinal body, by the anti-end thrust bearing 75. The two normally retracted secondary clutch members 73 and 74 are connected to rotate together preferably by splines indicated at 78 and form a body of relatively longitudinally movable members rendered free to standstill by virtue of their mounting bearings 75 and 76, whereby all associate and adjacent elements may rotate without imparting or causing the members 73 and 74 to rotate. Thus the primary function of the clutch members 73 and 74 is to form a resilient means longitudinally movably retracted device operating normally to energize engagement of the pivotal element brake unit e to the first distinct multi-speed planetary gear unit a. Secondarily, the normally retracted members 73 and 74 form an actuator for completing engagement of a clutch for the individual coupling of the high speed ratio sleeve shaft 57 to the driving member 10. To complete this actuator ability of the normally retracted clutch members 73 and 74 which are adapted to normally standstill, I provide centrifugal (speed responsive) weights 79 preferably suspended by means of opposing links 80 and 81 from the clutch members 73 and 74, with the weights 79 normally disposing below the horizontal dead center line of the links 80 and 81. To complete this secondary engaging clutch mechanism I provide a clutch shell 82 detachably secured to the flywheel 11 and extending rearwardly and inwardly at the back to form a fixed bottom friction clutch member 83. And between the normally still but distinct speed responsive means actuatable clutch member 74 and the fixed bottom friction clutch member 83, I interpose a driven clutch disk 84 to rotate by virtue of splines 85 with the engaging brake element 71 and its rotatably connected carrying sleeve shaft 57. Thus, the fixed bottom friction clutch member 83 becomes a driving frictionally-engageable clutch element. The two normally still and retracted clutch members 73 and 74 become driven frictionally-engaging clutch elements adapted to be excited to rotate, whereby the centrifugal weights 79 will operate to urge the members 73 and 74 apart. The resultant speed responsive means cause initial spreading apart of the members 73 and 74 tending to actuate the member 74 rearwardly and in turn the engaging brake element 71 rearwardly out of engagement with its mate stationary brake element 70, through the medium of the end thrust bearing 76 which operatively connects the centrifugal clutch actuated member 74 and the disengageable brake element 71. And thereafter under progression of longitudinal movement of the clutch member 74 by the centrifugal weights 79, the driven clutch disk 84 is engaged by the mate driven clutch member 74 and thrust into engagement with the fixed bottom friction driving clutch member 83. The brake element 71 thus becoming disengaged and the driven clutch disk 84 subsequently becoming clutched to the driving member 10, both progressively in response to the speed responsive means force of the singular acting system of centrifugal weights 79. Thus the positive two-way gear drive state of the primary driving multi-speed gearset a is automatically cancelled by the pivotal element 22 thereof being first released to rotate and the same being immediately thereafter connected to rotate with the driving member 10. This secondary speed responsive automatic clutch mechanism unit forms an accumulatively engageable unit of the speed responsive automatic clutch means indicated at c, and is designed and facilitated by its adaptation to remain at a standstill until timed to engage to clutch the driven disk 84 sufficiently to take the full load of the higher speed ratio of drive thus effected at a very rapid rate as compared to the conventional centrifugal clutch which rotates throughout the progression of accelerating speed of rotation. Since this novel centrifugal clutch unit is facilitated to standstill until its clutch function to change the speed ratio of drive is timely, its retractive spring element 77 may be of unusually low tension in ratio to its centrifugal weights 79, giving almost instant complete clutch engagement upon being excited to rotate and having a consequent virtue of holding engagement for maintaining the higher speed ratio of drive considerably below the condition which controlled the function to cause its high speed ratio of drive effecting engagement.

As a primary distinct speed responsive automatic engaging clutch unit to complete the speed responsive automatic clutch mechanism control c over the first or driving distinct multi-speed gearset a, I provide a distinct driven clutch disk 85 connected to rotate with the main clutch shaft or driving element 14 to the low speed ratio of drive sun drive gear 13 of the first planetary gear unit a. A distinct driving presser clutch plate 86 rotates with, but is longitudinally movable relative to, the flywheel 11 and driving member 10. Distinct retractive springs 87 acting on the presser plate 86 to normally urge same to rest in a position in furthermost adjacency to the flywheel 11. A distinct system of centrifugal weights 88 carried in rotation with the flywheel 11 and having actuating feet 89 wedged between the flywheel 11 and the adjacent presser plate 86. A distinct bottom friction driving clutch plate 90 also carried in rotation with the flywheel 11, but longitudinally movable relative to the flywheel 11. And a distinct system of springs 91 urging the bottom plate 90 to rest in a normal position out of engagement with the driven clutch disk 85 in which said presser plate 90 will resist energized engagement of the disk 85 thereupon until said disk 85 has been sufficiently gripped to rotate with the flywheel 11 to carry the load on the shaft 14 without slip. Beyond this clutch function of the disk 85, the springs 91 are adapted to gradually yield to progression of centrifugal means energizing of the respective clutch unit engagement until and whereby the bottom plate 90 will reach engagement with the member 73 of the normally secondary or high speed ratio connecting clutch unit at a predetermined speed of rotation attained by the driving member 10 and flywheel 11. Thus the primary engaging clutch unit, consisting of presser and driven and bottom plates 86, 85 and 90 which operate under the driving member speed responsive centrifugal weights 88, operates as an exciter to initiate rotation of the normally secondary clutch unit after first coupling the low speed ratio train shaft 14 to rotate with the driving member 10. The secondary clutch unit of normally still but rotatively excited members 73 and 74 and their distinct system of speed responsive centrifugal weights 79 operates as a distinct automatic actuator first to open the brake unit e and thereafter to complete engagement of the respective secondary engaging clutch unit whereby the first planetary gear unit a is changed from a positive two-way gear driving state to a positive two-way direct driving state. It will be seen, while the shiftable clutch member 63 occupies a reverse drive preselecting position, that is, with clutch jaws 59 and 66 engaged and with clutch jaws 62 and 64 disengaged, that opening of the brake unit e and subsequent engagement of the normally high speed effective clutch disk 84 will have no effect. The reverse drive will continue through the medium of the disk 85 throughout the engine or driving member speed range. Likewise, while the shiftable clutch 63 occupies a permanent positive gear drive preselecting position, that is, with clutch jaws 60 and 66 engaged and clutch jaws 25 and 65 engaged, but with clutch jaws 62 and 64 disengaged, that opening of the brake unit e and subsequent engagement of the normally high speed effective clutch disk 84 will have no effect. The permanent positive gear drive will continue throughout the engine or driving member speed range. Thus I have described in detail the multi-speed responsive automatic clutch mechanism control over one of the two distinct multi-speed gearsets of my invention.

It will be seen that the normally engaged clutch elements 39 and 41 operate to permanently relate the second or driven distinct multi-speed gearset b to give a positive direct drive couple between the driven gear 18 of the first or driving multi-speed gearset a and the driven member 12; that the normally engaged brake unit e will operate, as long as the shift clutch 63 is positioned to give a "forward drive for automatic change of speed", that is with clutch jaws 62 and 64 and 25 and 65 engaged, to hold the pivotal element 22 of the said first gear unit a from rotating in either direction; and that consequently any tendency of the driven member 12 to rotate like forward drive (as indicated looking from the front of the transmission by the arrows) will cause the clutch shaft 14 to be similarly rotated through the medium of the interlocked planetary gear unit b to the driven gear 18 and therefrom through the medium of the planet cluster gears 21 and 20 to the sun drive gear 13. This being the case, I provide an overrunning clutch 92 between the main clutch shaft 14 and the engine driven driving member or engine crankshaft 10 whereby the engine may be started from the forward motion of the vehicle, circumventing the speed responsive automatic clutch mechanism c which depends upon engine or driving member speed for engagement to complete the same driving connection. An additional function of this overrunning clutch 92 is its contributing to the present transmissions ability to afford parking in gear against engine compression, either in preselected "forward drive for automatic change of speed" or in preselected "permanent positive gear", both against the car rolling forward. In either of the forward driving preselections thereof the car is automatically parked in gear against the engine compression preventing forward roll of the vehicle, and in the same preselections, by virtue of the "no-back" overrunning clutch 52 and the normally engaged brake unit e, the car is automatically prevented from rolling backwards. Optional release of the normally engaged clutch elements 39 and 41 will release either of the in-gear parking functions of the transmission. The overrunning clutch 92 is illustrated in detail in Fig. 2 and comprises a driving cam member 93 splined to the main clutch shaft 14. An annulus 94 secured by the usual flywheel-to-crankshaft bolts 95 to the driving member 10. And roller clutch members 96 between and engaging each the cam and the annulus members 93 and 94. The driving member may overrun the clutch shaft 14 in its normal power transmitting direction of rotation. Hence the overrrunning clutch 92 in no way interferes with the operations of the speed responsive automatic clutch mechanism c.

The usual clutch pilot bearing 97 carried by the crankshaft-flywheel driving member 10 embodiment journals the main clutch shaft 14 as customary.

It will be clear that desired and satisfactory results may be obtained from either flat single or multiple disk units of frictionally-engaging elements as a substitute for brake unit e or the elements 39, 40 and 41 and without departing from the spirit of the invention.

The operation

*Preselected neutral.*—The jaw clutch 63 is shifted either forwardly or rearwardly from the position in which it is shown until the clutch jaws 64 are disengaged from the jaws 62. This frees the planet carrier pivotal element 22 to rotate in either direction either under drive from shaft 14 or drive from gear 18.

*Optional neutral while the car is in motion.*—The engaging cone 41 may be moved rearwardly against the tension of the spring 42, taking the cone 41 out of engagement with the clutch cone 39 without bringing the cone 41 into engagement with the brake cone 40. With the conventional clutch pedal (not shown) adapted to accomplish this actuation, a half depressed pedal would accomplish this optional opening of the driving train from any speed ratio of drive of either forward or reverse drives, while a fully depressed clutch pedal would bring the engaging cone 41 into engagement with the brake cone 40 and render the distinct multi-speed planetary gear unit b operative through its gear train to reduce the speed substantially 1:42 to 1 ratio at this opint.

*Preselected for forward driving and for centrifugal automatic drive coupling and uncoupling and centrifugal automatic change of speed.*—The jaw clutch 63 is moved from either of the aforementioned neutral positions, respectively, either from the right or from the left, into the position in which it is shown. In this position the planet carrier-pivotal element 22 is locked, through the medium of the jaw clutch 63, to the high speed ratio effecting sleeve shaft 57. The shaft 57 being normally held from rotating in either direction by virtue of the brake unit of frictionally-engaging elements e, the latter being engaged under tension of the retractive springs 77 acting on the normally still high speed clutch member 74. Since the normally still clutch member 73 is restrained from moving longitudinally in either direction by the thrust bearings 75 and 61 and the connecting sleeve shaft 57, the pull of the springs 77 will act effectively wholly upon the clutch member 74, in turn urging the brake cone 71 into engagement with its mate 70 through the medium of the thrust bearing 76. The jaw clutch 63, thus positioned (as shown); the high speed ratio clutch unit engagement energizing clutch members 73 and 74 normally standing still; and the high speed ratio clutch retracting springs 77 operating to engage the brake unit e to the first multi-speed planetary gear unit a, all operate jointly to normally establish the gear unit a operative to two-way gear drive, that is from drive gear 13 to driven gear 18 through planet gears 20 and 21 at substantially 2:23 to 1 reduction or vice versa; and the second distinct multi-speed planetary gear unit b being normally established in interlocked relation to rotate as a unit by virtue of the clutch elements 40 and 41 being normally engaged under tension of the spring 42. The transmission drive is ready to be completed between the driving and driven members 10 and 12 by the driving member speed responsive automatic clutch consisting of plates 86 and 90 and disk 85 and centrifugal weights 88. Hence, preselected for forward drive and for automatic change of speed, the driver need but accelerate the engine and upon the centrifugal weights 88 being accelerated to a predetermined speed of rotation the driven disk 85 will be clutched between the centrifugally actuated pressure plate 86 and the respective bottom friction plate 90 thereto. The load on the driven member 12 will thereby be power driven normally at the 2:23 to 1 reduction of the first distinct planetary gear unit a, and through the direct drive coupling medium of the locked second distinct multi-speed gear unit b. It will be seen that while preselected to drive upon accelerating the engine as described, the transmission train may still be opened at the will of the driver by moving the engaging cone 41 out of engagement with the clutch cone 39. The result being to free the gears of the distinct multi-speed gearset b for idle operation while either or both driving and driven members 10 and 12 are running at sufficient speed to otherwise complete the driving connections therebetween. Hence, while the engine driven driving member 10 is idling and the automatic drive completing centrifugal clutch mechanism c is still open, the preselector jaw clutch 63 is rendered free to be shifted selectively either into "forward automatic", "permanent positive gear", "reverse" or "neutral"; and while the vehicle is in motion and the centrifugal clutch c is engaged, the gearing can be loosened at the unit b to facilitate shifting of the preselector jaw clutch 63 by optionally opening the combined clutch and brake unit governing the second distinct multi-speed gearset b.

It will be seen that alternate engagement (under driven control) of the engaging cone 41 with the stationary cone 40 will change the second distinct multi-speed gear unit b from a direct drive coupling function to a state of gear driving. This gear driving of the gearset b, being substantially a reduction of 1:42 to 1, will operate to compound this one step lower whatever the speed ratio of drive is by the first gearset a. That is, if the first gearset a is gear driving, its ratio will be 2:23 to 1 reduction. Plus 1:42 to 1 reduction gear drive in the second gearset b, gives a 3:17 to 1 reduction drive to the driven member 12 as compared to the speed of the driving member 10. Or, if the first gearset a is operating as a direct drive coupling (rotating as a unit) and the second gearset b is gear driving, the drive to the driven member 12 will be 1:42 to 1 as compared to the speed of the driving member 10. Or, if both gearsets a and b are operating as direct drive couplings, the drive to the driven member 12 will be at the same speed as the driving member 10. Thus four forward speeds are available without a shift of positive or dentate elements, requiring no temporary deceleration of the engine, or no reverse of torque.

Whether or not the first distinct multi-speed gearset a is operating as a direct drive coupling depends upon the speed of rotation of the engine or driving member 10. Upon the engine or driving member 10 attaining an accelerating predetermined speed of rotation (after the clutching of the low speed ratio drive associate clutch disk 85 under initial engagement energizing of the weights 88) say a speed of the driving member 10 rotation corresponding to 20 M. P. Hr. accelerating vehicle speed attainment under drive of the 2:23 to 1 reduction only of the first gear unit a. Or a speed of driving member 10 rotation corresponding to 14 M. P. Hr. accelerating vehicle speed attainment under drive of the compound speed reduction of 3:17 to 1 contributed to by both gear units a and b. The springs 91 will have yielded sufficiently to bring the bottom friction clutch plate 90, of the first centrifugally engaged clutch unit, into engagement with the normally still driven clutch member 73 of the secondary engaging clutch unit. This engagement of the revolving plate 90 with member 73 excites the latter and its rotatively connected mate member 74 to rotate. With the result that the comparatively light springs 77 will be overcome by the comparatively high ratio of force of the centrifugal weights 79.

Since the weights 79 suspend between the members 73 and 74 and the member 73 is positively prevented from moving longitudinally in either direction, by virtue of bearings 75 and 61, either under urge from the springs 77 or the weights 79, the weights 79 therefore, under initial rotation, exert themselves effectively solely upon the member 74, forcing the member 74 rearwardly and the bearing 76 in turn forcing the brake cone 71 rearwardly out of engagement with its mate stationary brake cone 70. This loosens the first planetary gear unit a to be changed from gear train transmitting at reduced speed to direct drive.

Under progression of the centrifugal force of the weights 79 (after having caused the disengagement of the brake unit e as lastly explained) the clutch member 74 is progressively actuated rearwardly until the driven clutch disk 84 is gripped between the actuating or distinct pressure plate 74 and the back 83 of the clutch shell 82. Thus the singular system of centrifugal weights 79 and their distinct unit of normally still and disengaged driven clutch members 73 and 74 form a combined brake releasing and change speed automatic actuator. For the gripping of the clutch disk 84 to rotate with the driving member 10 accumulatively with the first or low speed gripped clutch disk 85 operates, through the instrumentalities 72 connecting the clutch disk 84 and sleeve shaft 57 and the jaw clutch 63 connecting the sleeve shaft 57 and the pivotal element 22, to lock the first distinct multi-speed planetary gear unit a to rotate as a unit, completing a direct drive connection between the driving member 10 and the driving internal gear member 26.

An important advantage of the novel provision of the secondary distinct centrifugal automatic clutch system, adapted and provided with bearings mounting same to normally remain at a standstill until excited to rotate by timed engagement from the primary low speed ratio of drive effecting centrifugal clutch unit, and thereafter to first open the positive brake holding the respective planetary gear unit gear drive operative and then clutch the planetary gear unit to direct drive operate, is the accomplishment of automatic change between positive two-way driving different speed ratios of drive by multi-speed responsive automatic means operating accumulatively, omitting overrunning clutches and the usual free-wheeling. Also the elimination of excessive, or in fact any possibility of appreciable slip in the speed changing secondary centrifugal clutch engagement.

*Optional permanent positive driving or engine compression brake acting second gear.*—The jaw clutch 63 is shifted rearwardly, from the position in which it is shown, until the clutch jaws 66 engage the stationary jaws 60, leaving the clutch jaws 65 in engagement with the splines or jaws 25 of the pivotal element 22, but taking the clutch jaws 64 out of engagement with the jaws 62. By this shift the pivotal element 22 of the primary distinct multi-speed planetary gear unit a is fixed in positive connection with the stationary jaws 60 and the pivotal element connection with the high speed ratio changing sleeve shaft 57 is opened. The gear unit a thereby is rendered permanently operative as a two-way gear drive. Availing the vehicle's momentum with the brake action of the engine compression whenever the engine is decelerated. While standing still, the centrifugal clutch mechanism c will be open permitting the shift of the jaw clutch 63 from some other selection into the lastly described shift into "permanent positive gear drive"; and while the vehicle is in motion and the centrifugal clutch mechanism c is engaged, the drive may be loosened to permit the said shift by depressing the contemplated clutch pedal (not shown) but to result in the cone 41 being disengaged from the clutch cone 39.

*Optional permanent positive first (low) gear.*— While the shift clutch 63 is positioned to establish the first gear unit a in "permanent positive gear operation", the clutch member 41 may be taken out of engagement with the clutch member 39 and brought into engagement with the stationary cone 40 and locked therein by any suitable means (not shown). This renders the two distinct multi-speed gear units a and b operative to compound their respective positive two-way driving gear ratios, giving the low driving or compression gear. This, obviously may be changed back to second speed positive gear by releasing the clutch member 41 to return to its normal engagement with the clutch member 39, thus interlocking the gear unit b to direct drive, leaving only the gear unit a gear drive operative. Or, the permanent positive low may be changed to permanent positive third, by momentarily releasing the member 41 from the brake cone 40 without letting the member 41 come into engagement with the clutch member 39, thus loosening the drive train to permit the shift of the selector jaw clutch 63 from its selection of permanent gear operation to the position in which it is shown. And after completing said shift of clutch member 63, to again bring and cause the member 41 to be held in engagement with the brake cone 40.

*Parking-in gear.*—Automatically upon stopping the vehicle, while the transmission is preselected either for "forward drive and for automatic change of speed" or preselected in "permanent positive gear", the overrunning clutch 52 will lock the vehicle from rolling backwards against the held pivotal element 22 of the front planetary gear unit *a*. And upon stopping the engine the vehicle is locked against the engine compression through the medium of the overrunning clutch 92 from rolling forward. Hence, in my improved automatic change speed transmission I have provided for automatic parking in gear.

*Automatic but optionally releasable no-back.*—The transmission preselected in either "forward for automatic change of speed" or in "permanent positive gear" finds the pivotal element 22 of the front planetary gear unit *a* held against rotating in either direction. The rear planetary gear unit *b* being normally interlocked by the engaging members 41 and 39 to rotate as a unit renders the driven gear 18 of the front gear unit *a* rotatable in either direction with the driven member 12. And the overrunning clutch 52 locks the driven gear 18 against the held pivotal element 22 from rotating backwards under urge from the driven member 12. Hence the driven member 12 as well as the positively connected vehicle driving wheels therewith are prevented from backward rotation. To release the vehicle wheels to roll backwards, the friction member 41 is disengaged from the clutch member 39. If the shaft 48 is connected with the conventional clutch pedal and the latter is retained for actuating the shaft 48, slight depressing of the clutch pedal will place the driver in easy control over and to release the "no-back".

*To race the engine while preselected in gear.*—Partial depressing of the clutch pedal (retained to actuate the shaft 48) will open the drive train in the rear planetary gear unit *b* and permit of racing the engine to any degree desired, without incurring propulsion to the vehicle's driving wheels, notwithstanding the resultant engine speed automatic engagement of the centrifugal automatic clutch mechanism *c* which would normally complete the driving connections to propel the vehicle's driving wheels. Therefore, the present invention in connection with a retained clutch pedal placed in connection to actuate shaft 48, allows for substantially the same clutch pedal results as obtained in the conventional motor vehicle transmission.

*Neutralizing the transmission while the vehicle is in motion.*—The depressed clutch pedal disengagement of the clutch elements 41 and 39 will permit of shifting the jaw clutch 63 into neutral. As will the depressed clutch pedal disengagement of the clutch elements 41 and 39 permit of shifting the jaw clutch 63 back into any drive preselecting desired.

Thus I have described in considerable detail my improved automatic change speed transmission, which gives automatic declutching and reclutching, respectively, upon stopping the vehicle and upon accelerating the engine to pick up the load; which affords either low or second or third gear drive operations permanently and respectively such as will render the customary engine compression braking action against vehicle momentum; which affords, with only slight additional parts, an automatic but optionally releasable no-back; which provides that its engine speed responsive automatic clutches may be circumvented and the engine started from the force of the vehicle in motion, as is sometimes necessary; which automatically parks the vehicle in gear when the ignition key is turned off, if the preselector jaw clutch is not shifted into neutral; which affords an automatic speed changing centrifugal friction clutch mechanism having a normally still speed responsive actuator which will cause almost instant and slipless accumulating clutch engagement to change the speed at a predetermined vehicle speed attainment regardless of engine acceleration being maintained or not; which provides a flexible driver imposing control over the speed ratio of drive superimposing the speed responsive automatic speed ratio of drive selection, so that the driver may maintain a speed reducing gear drive up to any desired vehicle speed attainment without shifting of gears or any other form of characteristically clashable positive dentate elements; and which is rugged, exclusively mechanically, and omitting fluids and pneumatics and electric accessories which are all intricate and troublesome and more expensive.

I claim:

1. In a motor vehicle drive, the combination of a driving member driven by the vehicle engine, a driven member for positive operative connection to the driving wheels of the vehicle whereby said driven member is adapted to propel said vehicle and whereby said driven member may be rotated by either forward or backward movement of said driving wheels, a multi-speed transmitting mechanism between said driving and driven members including a transmitting train having an overrunning clutch in series therein completing said train in connection to be driven in backwards rotation from said driven member incident to backward movement of said driving wheels, means including another clutch mechanism for connecting said train in two-way drive with said driving member, means for actuating said other clutch mechanism into and out of engagement, brake mechanism including frictionally-engaging elements including a stationary element and a mating normally engaging element forming means normally operative at least to prevent said backwards rotation of said train, control means to the frictionally-engaging brake elements, said control means forming an operative connection with said other clutch mechanism whereby actuation of the latter towards engagement, to complete the driving connection of said train with said driving member, will cause disengagement of said brake elements, all whereby said train may normally operate as a no-back device, through the medium of said driven member being in connection with said vehicle driving wheels, to prevent backward movement of said wheels while driving connections are incomplete between said driving and driven members.

2. The invention as claimed in claim 1, together with means including other frictionally engaging elements provided with means normally but yieldingly engaging same whereby the driving connections of said train are complete between said frictionally-engaging brake elements and said driven member, said other elements forming means disengageable under control of the driver whereby said train may be loosened at the will of said driver to permit said driving wheels to move backward.

3. In a motor vehicle drive, in subcombination a driving member driven by the vehicle engine, a driven member for two-way drive coupling to the driving wheels of said vehicle, a multi-speed transmitting mechanism between said driving and driven members, a multi-speed planetary gear unit in said transmitting mechanism, a pivotal element of said gear unit adapted to be restrained from rotating backwards to render said gear unit operative as a forward driving gear train towards said driven member, transmitting means including an overrunning clutch in series therein forming an operative connection to include said planetary gear unit such that said driven member may normally rest against said pivotal element under any tendency of said driving wheels to roll backwards, means including normally but yieldingly engaged frictionally-engaging elements disengageably under control of the driver for optionally opening said connection whereby said driving wheels could roll backwards, means including a stationary member and means including other normally but yieldingly engaged frictionally-engaging elements whereby said pivotal element is normally connected to be restrained from rotating backward by said stationary member, and means for releasing said no-back restraining means to said pivotal element and for substantially establishing a certain driving connection to said planetary gear unit from said driving member.

4. The motor vehicle drive mechanism claimed in claim 3, wherein said last-mentioned means includes a double speed responsive automatic clutch mechanism initially operable to give a driving connection between said driving member and said planetary gear unit, and speed responsively operable to render secondly said no-back restraining means to said pivotal element inoperative and speed responsively operable subsequently to adjust said planetary gear unit to drive toward said driven member without said dependency upon said no-back restraint upon said pivotal element.

5. In power transmitting mechanism, in subcombination two multi-speed planetary gear units, a connecting body associating said two units comprising an element of one and an element of the other of said two planetary gear units, with a pivotal element of one of said two planetary gear units adapted to be restrained from rotating backwards to render the respective gear unit gear functional to transmit forward rotative efforts, means normally applied but optionally releasable normally rendering said restraint upon said pivotal element, and an overrunning clutch means between said connecting body and said pivotal element whereby any tendency of said body to rotate backwards will be exerted upon said pivotal element.

6. In a power transmitting mechanism, having in subcombination driving and driven power transmitting members; with means including driving and driven frictionally-engageable clutch elements functionally divided and adapted for two-stage engagement forming a clutch mechanism for drive connecting said driving and driven power transmitting members comprising, a first stage frictionally-engaging element carried in rotation with one of said driving and driven power transmitting members, a second stage engaging unit of frictionally-engaging elements for completing said clutch function to drive connect said driving and driven power transmitting members, said second stage engaging elements including an actuating element mounted and adapted to standstill until engaged by the said first stage engaging element, means normally acting to yieldingly hold said first stage engaging element out of engagement with said actuating element of said second stage engaging elements, and distinct speed responsive means carried in rotation with each the said first stage engaging element and the said actuating element of said second stage engaging elements, respectively, for primarily actuating the said first stage engaging element to engage and cause initial rotation of said actuating element of said second stage engaging elements upon the said first stage element carrying one of said driving and driven members attaining a predetermined speed of rotation, and for individually actuating said actuating element of said second stage engaging elements to cause engagement of said second stage engaging elements at a high speed responsive coefficient-to-speed of rotation, all whereby said drive connection between driving and driven power transmitting members may be frictionally accomplished with a minimum of slip.

7. In a power transmitting mechanism, a subcombination system of multi-speed ratio of drive trains; means including a first unit of frictionally-engaging elements and means normally but yieldingly causing engagement of same, forming means relating at least one of said trains to transmit rotative efforts, said first unit of elements being arranged to be disengaged under urge to move longitudinally, means including a second unit of frictionally-engageable elements forming means for relating another of said trains to transmit rotative efforts, said second unit of elements arranged to engage by longitudinal movements, means giving an inter-control operative connection between the said first and said second units of elements whereby the longitudinal movements of said second unit toward engagement will operate to cause disengagement of said normally engaged first unit of elements, and speed responsive automatic means for moving said second unit of elements longitudinally into engagement, all whereby progression of force of a singular acting speed responsive automatic means may first cause disengagement of one unit of elements and subsequently cause the engagement of another unit of elements and facilitate one driving speed ratio train having two-way drive capacity being automatically substituted for another driving speed ratio train having two-way drive capacity in multi-speed transmitting means in which power transmitting overrunning clutches are omitted.

8. With a multi-speed planetary gear unit having a pivotal element, the subcombination of a selective drive establishing means including a shiftable jaw clutch member shiftable into one position and a unit of frictionally-engaging brake elements, the latter provided with resilient means normally energizing engagement of said same, forming a connectable and disconnectable train of means for normal operation to prevent said pivotal element rotating but for optional disconnection by shifting the said jaw clutch member out of said one position and into another position, and means for automatically disconnecting said train including speed responsive automatic means for disengaging said brake elements, without molesting the selective jaw clutch mechanism.

9. In a motor vehicle drive, in subcombination, with a power transmitting member adapted to be driven by the change speed transmission system of the vehicle and for two-way drive coupling to the driving wheels of the vehicle whereby said driven member will be urged to rotate under the influence of any tendency of the driving wheels of the vehicle manifesting any tendency to rotate in either direction; of a multi-speed transmission system including means for selectively establishing same either to forward or reverse drive said driven member, said forward drive of said transmitting means including a planetary gear unit having a pivotal element and means normally operative to hold said pivotal element from rotating at least backwards; means including an overrunning clutch rendering said forward drive operative through the medium of said planetary gear unit to arrest any tendency of the said driven member to rotate backwards against the held pivotal element and its said holding means; and means including a unit of frictionally-engaging elements provided with releasable means normally engaging same and with means under control of the driver for releasing said means so as to in turn loosen said unit of elements forming means whereby said driver may optionally cancel the normal capacity of said forward drive train to arrest backwards rotation of said driven member.

10. In a power transmitting mechanism, in subcombination a multi-speed planetary gear unit having drive and driven elements and a pivotal element the latter to be restrained from rotating backwards to render said planetary gear unit functional to give a forward drive between said drive and driven elements; means including frictionally-engaging elements forming means normally holding said pivotal element from rotating backwards; and means including an overrunning clutch between said driven and said pivotal elements to rest any tendency of said driven element to rotate backwards upon the restrained pivotal element.

11. With driving and driven members and planetary gear unit including a gear element for connection to rotate with one of said members and including a pivotal element adapted to be either restrained from rotating to render said planetary gear unit gear functional or to be connected to rotate with one of said members for the interlocking of said planetary gear unit to rotate as a unit; in subcombination means including a brake system of normally but yieldingly engaged frictionally-engaging elements for restraining said pivotal element from rotating in either direction to render the planetary gear unit gear functional in either direction; and means including a centrifugally engaged system of frictionally-engaging elements forming automatic means for first connecting said gear element to said one of said driving and driven members and for thereafter centrifugally energizing disengagement of said brake system of elements and for subsequently causing said connection for said pivotal element to rotate with said one of said members.

12. In a motor vehicle drive, the combination with a driving member to be driven by the vehicle prime mover; of a multi-speed transmission system to be driven by said driving member having a planetary gearing operable to give either a low or a higher driving ratio; means including a first centrifugal automatic clutching mechanism responsive to the speed of said driving member for completing the driving connections of said transmission system with said driving member whereby the said low driving ratio of said planetary gearing will be brought into play; means for completing the driving connections of the said transmission system with said driving member whereby said higher driving ratio of said planetary gearing will be brought into play, said higher speed ratio of drive completing means including a second centrifugal automatic clutching mechanism having its respective centrifugal actuating means and actuated clutch elements mounted to stand still until said first centrifugal clutching mechanism has completed its own clutching function; and automatic means operative after the clutching function of said first centrifugal clutching mechanism to cause the centrifugal actuating means aforesaid standing still and the actuated clutch elements therewith respectively of the said second centrifugal automatic clutching mechanism to rotate sufficiently to complete its own clutching function.

13. In a motor vehicle drive, in combination, a driving member adapted normally to be driven by, but under certain conditions to drive, the vehicle engine; a vehicle propelling member adapted for two-way drive coupling the driving wheels of said vehicle; transmitting means including a gear train and a normally but yieldingly engaged brake unit of frictionally-engaging elements and a firstly engaging speed responsive automatic drive coupling mechanism forming joint operating means for initially drive connecting said members at one speed ratio; and means including a normally inactive speed responsive automatic drive coupling mechanism for supplantively establishing said transmitting means operative between said members at another speed ratio, said normally inactive automatic coupling mechanism being in control connection with, and adapted upon being motivated toward engagement to cause disengagement of, said brake unit, and means for initially rotatively exciting the said normally inactive speed responsive automatic coupling mechanism into action.

14. In a power transmitting mechanism, driving and driven members, variable speed transmitting means between said members including a plurality of transmitting trains each to give a different driving ratio and each having an individual pair of drive connectable members respectively connectable at least to contribute to completing the driving connections of the respective train between said driving and driven members, and means for connecting at least one pair of said connectable members comprising, a clutchable friction member connected to rotate with one member of said one pair, a longitudinally fixed mating driving clutch element carried in rotation with the other member of said one pair, a unit of longitudinally retractable and longitudinally expandable friction clutching elements mounted to normally stand still regardless of rotation of any associate engageable element, means normally but yieldingly urging said unit of normally still elements into maximum retracted positions, an individual system of centrifugal weights carried by, and adapted to normally stand inactive with, said normally still clutching elements, said system of centrifugal weights expandably actuating said normally still clutching elements to clutch the said driven clutchable element to the said mating longitudinally fixed driving clutch member; a longitudinally movable driving clutch member carried in rotation with the said other member of said one pair forming means to be speed responsive means timed and actuated into engagement with said normally still unit of clutching elements to excite the latter to rotate, and a system of centrifugal weights carried in rotation with, and adapted upon a predetermined speed of rotation of, said other member of said one pair to actuate said longitudinally actuatable movable driving clutch member into engagement with said normally still unit of clutching elements.

15. A power transmitting mechanism having in combination a multi-speed planetary gearing for low speed ratio of rotation transmission operation and for high speed ratio of rotation transmission operation, with a brake means system of normally but yieldingly engaged frictionally-engaging elements for normally rendering said planetary gearing operative at said low speed ratio, and an automatic system of frictionally-engageable elements forming an actuator for disengaging said brake means system of elements and forming means for successively rendering said planetary gearing operative at said high speed ratio, said automatic system of elements including an automatic means actuated primarily engaging unit of said system of elements and a normally still secondarily engageable unit of said system of elements, said normally still unit to be frictionally contacted to thereby be initially excited to rotate by said automatic means actuated primarily engaging unit of said elements, distinct speed responsive automatic means carried by, and for actuating, said normally still unit into engagement, and means whereby the speed responsive means will operate under initial rotation of said excited secondarily engageable unit of elements to cause disengagement of said brake means system of elements and subsequently promote complete engagement of said automatic system of elements to cause said rendering of said planetary gearing operative at said high speed ratio.

16. A variable speed transmisssion mechanism comprising axially aligned driving and driven members, variable speed transmitting means to drive said driven member including a low driving ratio train and a high driving ratio train each having a driving element for connection to said driving member, a first friction clutch constructed with driving elements rotatable with said driving member and driven elements rotatable with said driving element of said low driving ratio train, one of said first clutch driving elements forming a presser clutch member and another of said driving clutch elements forming a bottom friction clutch member both of said first clutch, first resilient means operative to urge said presser member into a position in which said first clutch is open, second resilient means operative to yieldingly urge said bottom friction member to withstand a predetermined force coefficient of clutch engaging pressure from said presser member without yielding appreciably, speed responsive means carried in rotation with the driving clutch elements of said first clutch for actuating said presser member to engage said first clutch sufficiently to take the load of said low driving ratio train and for subsequently building pressure upon, and sufficient to cause, said bottom friction member to finally yield appreciably, a second friction clutch, said second clutch for connecting said driving element of said high driving ratio train to said driving member, said second clutch including normally retracted but expandable driven friction clutch elements provided with resilient means operative to retain said elements retracted under a predetermined speed of rotation, and speed responsive means carried in rotation with said retracted but expandable clutch elements for actuating same to expand incident to progression above said predetermined speed to engage with mating clutch elements, cooperating transmitting and carrying members to said second clutch including means rendering said retracted but expandable clutch elements thereof normally non-responsive to rotation of its said cooperating and carrying members, a bottom friction driving clutch member of said second clutch forming one of said mating elements to said expandable elements, said second clutch bottom member being rotatable with said driving member, said bottom friction member of said first clutch being adapted to act as a driving presser clutch member to said second clutch and forming another of said mating members to said expandable elements of said second clutch, and said bottom friction member of said first clutch adapted upon said final yielding to frictionally engage said expandable mate elements of said second clutch to thereupon excite the latter to speed responsively clutch function.

17. In a power transmission, the combination of driving and driven members, variable speed transmitting means between said driving and driven members, forward and reverse drive operative selective means for said transmitting means, low speed ratio and higher speed ratio of forward drive transmitting trains for said variable speed transmitting means, means including four distinct units of frictionally-engaging elements forming four distinct operation connecting devices for completing the different speed ratios of drive of said transmitting means between said driving and driven members, at least one of said units of frictionally-engaging elements being provided with resilient means normally energizing said unit into engagement, means under control of the operator for optionally disengaging said one normally engaged unit, and means including an overrunning clutch in series in one of the said forward driving trains and with which said one normally engaged unit contributes jointly to form means whereby said driven member will be prevented from rotating backwards while the said transmitting means is selected for forward drive.

18. In a change speed power transmission; a driving multi-speed planetary gear unit having, a pivotal element to be restrained from rotating in either direction to render said gear unit functional to transmit rotative efforts in either direction and having a driven member; a driven multi-speed planetary gear unit in driven connection with said driven member of said driving planetary gear nut and provided with means for rendering said driven planetary gear unit operative to transmit rotative efforts in either direction, with an overrunning clutch between said driven member and said pivotal element of said driving planetary gear unit whereby rotative efforts of either direction applied first to said driven planetary gear unit will be transmitted to and arrested directly by the said pivotal element of said driving planetary gear unit; a final driven member for two-way drive coupling between said driven planetary gear unit and the load; and means including a system of differentially engageable elements for selectively rendering said driven planetary gear unit operative at its different speed ratios to two-way drive transmit rotative efforts either from said driving multi-speed planetary gear unit to said final driven member or vice versa and for complete disengagement to place said driven planetary gear unit in neutral.

19. In a change speed power transmission which includes driving and driven members and multi-speed transmitting means between said driving and driven members, the combination of means including a stationary element forming a brake end element for said transmitting means and an overrunning clutch in series in said transmitting means forming means organizing certain elements of the latter into a train to rest under backwards rotation against said stationary element whereby said train will be normally prevented from turning backwards, means including a unit of frictionally-engaging elements for normal engagement forming a two-way drive effective coupling between said train and said driven member through the medium of which coupling said driven member may rest against said train and in turn said driven member will be normally prevented from rotating backwards, means normally but yieldingly engaging said friction elements to complete said coupling, and means under control of the operator for optionally disengaging said friction elements to permit said driven member to rotate backwards.

20. In a power transmission, the combination with a driving member for driving rotation in one direction and a driven member and multi-speed transmitting means including a shaft in contiguity with said driving member, of means including an overrunning clutch between said driving member and said shaft whereby said driving member will be urged to rotate in said one direction under any tendency of said driven member to rotate in a given direction, and means cooperating with said multi-speed transmitting means including another overrunning clutch forming a no-back train for said multi-speed transmitting means but permitting forward driving operations through said multi-speed transmiting means from said driving member or vise versa, means including a unit of frictionally-engaging elements forming a normally effective coupling to complete the driving connections of said no-back train to hold the said driven member, and means for optionally disengaging said friction elements to loosen said driven member from the said no-back train.

21. In a motor vehicle drive which includes driving and driven members, a combined clutch, variable speed planetary gear mechanism and brake mechanism for said planetary gear mechanism with said gear mechanism constructed as two independently variable speed planetary gear units, one of said units adapted to be differentially operatively connected to be driven from said driving member respectively to render different speed ratios of transmission and thereby forming means to drive the other of said two units at different speeds of input thereto, and said other unit forming means to drive said driven member either at the same speed as input to said other unit from said one unit or at a differentiated speed thereover; means including a first assembly of said brake mechanism cooperating solely with said one planetary gear unit whereby the latter is rendered gear functional to transmit rotative efforts from said driving member to said other planetary gear unit, and including a first assembly of said clutch mechanism associated with said driving member and cooperating with both said one planetary gear unit and said first assembly of said brake mechanism forming means therewith for completing initial driving connections between said driving member and said one gear unit whereby the latter will gear function to drive said other gear unit and said first assembly of clutch mechanism forming means for successively completing secondary driving connections between said driving member and said one gear unit whereby firstly said first assembly of brake mechanism will be actuated out of operation and subsequently said one gear unit will become static gear coupled and operate as a direct drive to said other gear unit; and means including a second assembly of said brake mechanism cooperating solely with said other planetary gear unit whereby the latter is rendered gear functional to drive said driven member, and including a second assembly of said clutch mechanism coordinated solely with said second assembly of said brake mechanism and with said other gear unit forming means for connecting the latter whereby its gears will be locked static such that same may operate as a direct drive to said driven member for whatever speed ratio of rotative efforts transmitted by said one gear unit; means for controlling said first assemblies of said brake and clutch mechanisms that cooperate with said one gear unit whereby the operations thereover aforesaid may be effected substantially as described; and means for controll'ng said second assemblies of said brake and clutch mechanisms including frictionally-engaging elements of both whereby either the brake unit or the clutch unit thereof may be caused to supplant the influence of the other over said other gear unit under torque.

22. The motor vehicle drive mechanism described by claim 21, wherein said control means, for said first assemblies of brake and clutch mechanisms that cooperate with said one gear unit, is automatically operable in response to variations in the speed of said driving member such that said first assembly of brake mechanism will prevail in effect over said one gear unit until said driving member has attained a predetermined speed and is such that thereupon said first assembly of brake mechanism will be actuated out of operation in response to progression beyond said predetermined speed.

23. A combined clutch, brake and transmission means coordination of members including a planetary gear mechanism embodiment wherein said planetary gear mechanism is arranged as a plurality of independently controllable variable speed gear units in tandem, with driving and driven members forming primary driving and final driven members to said tandem arrangement of planetary gear units, with said clutch mechanism formed in units one serving one and another serving another of said planetary gear units, with said brake mechanism formed in units one serving one and another serving another of said gear units, wherein the clutch mechanism unit serving one of said gear units is associated with and is automatically operable in response to variations in the speed of the there-operatively-adjacent one of said driving and driven members, and wherein the one brake mechanism unit serving the same said one of said gear units is provided with means normally but yieldingly operating same and wherein the same brake mechanism unit is intercontrol operatively connected with said speed responsively automatically operable clutch mechanism unit such that operation of said clutch unit in response to speed will cause said brake unit to be actuated out of operation by speed responding motivations of said clutch unit.

24. A combined clutch, transmission and transmission brake mechanism comprising a driving member, an aligned driven member, an intermediate shaft between and aligned with said driving and driven members, a plurality of independently variable speed planetary gear units in tandem forming multi-speed transmission means between and for operatively connecting said intermediate shaft and driven member, individual control means including a pivotal element of each of said plurality of planetary gear units and individual means both for preventing retrograde rotation at least of the respective pivotal elements and for alternatively connecting the respective planetary gear units to rotate as a unit, said retrograde rotation preventing means including an independently operable brake for the pivotal element of each of the plurality of plentary gear units and said unit rotatable connecting means including an independently operable clutch for locking each of said plurality of planetary gear units to rotate as a unit, means including a clutch mechanism distinctly operable to initially couple said intermediate shaft to said driving member and thereby the first of said plurality of planetary gear units to be driven from said driving member the latter so as to gear function to drive the next of said plurality of planetary gear units thereto, the individually operable clutch aforesaid for locking said first of the plurality of planetary gear units to rotate as a unit being associated with and automatically operable in response to variations in the speed of, said driving member and the individually operable clutch aforesaid for locking another of the plurality of planetary gear units to rotate as a unit being related solely with said other gear unit and forming means operable or inoperable at the will of the operator for changing the speed ratio of said other planetary gear unit over that controlled by said first planetary gear unit under its said speed responsively automatic clutch.

25. In a power transmission mechanism, the combination of driving and driven members; intermediary variable speed transmission means between said members including a variable speed planetary gearing system adapted independently controllable with respect to its driving ratio functions and having a plurality of elements for individual operative connection with said driving member, and including another variable speed planetary gear system adapted independently controllable with respect to its driving ratio functions and arranged between said driving planetary gear system and said driven member; means including differentially functional frictionally-engaging clutch elements associated with said driving member with means for controlling their functional engagements differentially forming means for operatively connecting said plurality of elements of said driving planetary gear system individually to said driving member thereby to give said independent control over the driving ratios of said driving planetary gear system; and means including a system of differentially functional frictionally-engaging elements associated exclusively with said driven planetary gear system, with means for controlling their frictional engagements differentially forming means for rendering independent control over the driving ratios of said driven planetary gear system.

26. In a power transmitting mechanism, in subcombination a variable speed planetary gearing; a driving member in tandem with said gearing; a driven member in tandem with said gearing; intermediary power transmitting members input and output from said gearing; a pivotal member of said gearing; brake mechanism including engageable and disengageable elements for restraining said pivotal element from rotating, with means normally operating, but retractable inoperative, engaging said brake elements; means complementary to said brake mechanism for completing driving connections between said driving and driven members such that will employ said planetary gearing; means including centrifugally automatically operable clutch mechanism carried in rotation with certain of said members and having as concurrently functional adaptations, under the influence of its centrifugal agent, the actuation of said brake elements out of engagement and the establishment of supplementive driving connections between said driving and driven members which will be simultaneously drive operative, and necessarily complementary to, said first-mentioned completed driving connections such that will employ said planetary gearing differentially over that influenced by said brake mechanism.

27. In a power transmission mechanism, in subcombination, a first power transmitting member and a plurality of concentric power transmitting members in axial alignment with said first member, a brake mechanism for normally restraining one of said plurality of members from rotating including engageable and disengageable parts provided with resilient means normally operative to engage said parts, a first system of clutch elements between and adapted to couple said first member and a member of said plurality other than said one member together and provided with means operable to engage and disengage same; a second system of clutch elements between said one member of said plurality and said first member and provided with means operable to engage and disengage same forming means for and adapted to culminate in the coupling of said one member to said first member also, and said system of clutch elements for culminating in said coupling of said one member to said first member being in operative connection with the engaged brake mechanism parts as the primary actuator to the latter whereby the actuation of the clutch elements toward effecting the coupling of said one member to said first member will have the effect of first causing disengagement of said brake parts, all substantially as described.

28. In a power transmission mechanism, the combination of a driving member, a driven member, variable speed transmission means between said members including a planetary gear mechanism having a pivotal member adapted to be restrained from rotating to render said gear mechanism gear functional and having a plurality of members adapted to be operatively connected to be driven from said driving member at least two of which plurality are each adapted to be individually operatively connected to said driving member, a stationary member, means including frictionally-engaging brake elements provided with means normally operable to engage same forming means for connecting said pivotal member nonrotatably restrained by said stationary member, a plurality of friction clutch elements associated with said driving member, one of said clutch elements connected rotatable with one of the plurality of planetary gear mechanism members aforesaid as adapted connectable to said driving member, another of said clutch elements connected rotatable with another of said plurality of planetary gear mechanism members aforesaid adapted connectable to said driving member, means automatically operable in response to a phase of variations in the speed of certain of said members other than said pivotal member to engage one of said clutch elements whereby one of said plurality of planetary gear members will become individually connected with said driving member, means automatically operable thereafter in response to a higher speed phase of variations in the speed of certain of said members other than said pivotal member to engage another of said clutch elements whereby another of said plurality of planetary gear members will become individually connected with said driving member, an operative connection between the means aforesaid operable in response to the higher speed phase and certain of said friction brake elements, and said higher speed phase automatically operable means forming an actuator operable through the medium of said operative connection with said brake elements to automatically cause disengagement of the latter as a preliminary function to engaging said other clutch element whereby said pivotal member of the planetary gear mechanism will be automatically released from said stationary member in advance of a supplemental member of said planetary gear mechanism being operatively connected to said driving member.

29. In a power transmission mechanism, the combination of a driving member, a driven member, variable speed transmission means between said members including a first planetary gear unit having a plurality of drive members thereto each adapted for individual operative connection with said driving member, means automatically operable in response to a first phase of variations in the speed of said driving member to render said individual operative connection with respect to a first one of said plurality of drive members of said first planetary gear unit, means automatically operable in response to a second phase of variations in the speed of said driving member to render said individual operative connection with respect to another of said plurality of drive members of said first planetary gear unit and in a manner whereby the first-mentioned rendered operative connection is sustained drive operating and whereby the joint said rendered operative connections, simultaneously employ a plurality of said drive members to said first planetary gear unit to drive the latter from said driving member such that said gear unit will render a different driving ratio than solely by the singular drive of said first-mentioned rendered operative connection with said driving member, a second planetary gear unit in series in said variable speed transmission means and in tandem with said first planetary gear unit with respect to giving a continuity of operative connections extending through said transmission means between said driving and driven members, automatic means normally operating to render said second planetary gear unit operative to give one driving ratio, means including frictionally-engaging elements operable to superimpose an influence over said second planetary gear unit whereby the latter may be rendered operative to give another driving ratio, said frictionally-engaging means of said last-mentioned means forming means for enabling change of the final driving ratio at the second of the multiplicity of planetary gear units under torque over the driving ratio in effect of the planetary gear unit governed by the speed responsive means aforesaid, and means under control of the operator for controlling said frictionally-engaging elements at will to superimpose said influence over said second gear unit.

30. Variable speed transmission mechanism comprising, in combination, driving and driven members and variable speed transmission mechanism between said members including a plurality of planetary gear units one to be driven from the other; means for completing a certain speed ratio of driving connections between said members so as to employ at least one of said plurality of planetary gear units gear functional, said means including a friction brake mechanism normally engaged and adapted thereby operative to render said one gear unit gear functional and means operable to operatively connect said one gear unit to one of said members for gear function in joint power transmitting relation therewith, and means operable to select the gear elements of other of the plurality of planetary gear units either gear functional or with its elements locked together and respectively such that said other of the plurality of planetary gear units will be in joint transmission function operating connection with the other of said members; means including a clutch adapted to lock together the elements of said one planetary gear unit and in operative connection with said brake mechanism for disengaging said brake mechanism as a consequence of initial motivations of the elements of said clutch upon same being actuated toward clutch engagement; resilient means normally urging said clutch out of engagement; and means operable under certain conditions to actuate said clutch into engagement such that the elements of said clutch will be motivated initially to effect said disengagement of the brake mechanism.

31. In a power transmitting mechanism, the combination of power transmission members including intermediary power transmitting members giving a transmitting train between two of said members and of which intermediary members certain are organized to form a planetary gear train to give several driving ratios, means including a brake mechanism for rendering said planetary gear train gear functional, means including a multi-clutch mechanism cooperating with said driving member and automatically operable in response to stepped phases of variations in the speed of certain of said members, respectively, to complete driving connections between said two members such that said planetary train will operate firstly at a gear functional ratio in conjunction with manifestations of said brake mechanism complementary thereto, and for completing other driving connections between said two members later whereby the manifestations of said brake mechanisms will be removed from said planetary gear train and whereby the latter will be concurrently converted to direct drive operate, and means including a one-way clutch mechanism in series in said transmitting train whereby the normal driving one of said two members may be caused to rotate in one direction under the urge of rotative tendencies in the same direction emanating in the normally driven one of said two members while said speed responsive automatic clutch means is inoperative.

32. In a power transmitting mechanism, a driving member, a driven member, variable speed transmission means between said members including a variable speed planetary gear mechanism having a pivotal element, means including a first system of elements engageable for preventing rotation of said pivotal element with means for engaging same, complementary operable means including a second system of elements being frictionally-engaging in character for completing driving connections of said transmission means between said members to operate said planetary gear mechanism at one driving ratio, means including a third system of elements also frictionally-engaging in character for completing other driving connections between said members, but cumulatively i. e., for supplementive operation with said first completed driving connections, so as to operate said planetary gear mechanism at another driving ratio, and means operable, incident to the motivations of the system of elements being engaged for the operation of said planetary gear unit at said other driving ratio aforesaid, and operable under conditions of sustained torque flow directionally tending to propel the load, to cause disengagement of the elements, and thereby release of, the means aforesaid that prevents rotation of said pivotal element, prior to completed engagement of said system of elements that will operate said gear mechanism at said other driving ratio.

33. In a motor vehicle drive, the combination of a driving member adapted for two-way drive operative connection with the vehicle engine; a driven member adapted for two-way drive operative connection with the driving wheels of said vehicle; transmitting means between said members embodying a plurality of variable speed planetary gear units to give operative connection continuity in said transmitting means intermediary of said members; control means operatively under the will of the driver for alternatively rendering certain of the plurality of planetary gear units either two-way gear drive or two-way direct drive operative; means including a brake mechanism cooperating with at least one of the plurality of planetary gear units whereby the latter is rendered gear functional to give said two-way gear drive operation and means including an overrunning clutch forming means associating certain members of the plurality of planetary gear units to form a transmitting train normally operable to prevent said driven member from rotating backward and whereby said no-back function is brought optionally releasably under said control means; and means for completing driving connections between said driving and driven members so as to employ the plurality of said planetary gear units.

34. In a power transmission mechanism, driving and driven rotatably mounted members, a train of transmitting means between said members including a planetary gear unit, a stationary member, means including a one-way clutch and frictionally-engaging elements and means associating said planetary gear unit with said one-way clutch and friction elements to form an operative connection from said driven member to said stationary member operative to prevent said driven member from rotating backward but permitting said train of transmitting means to operate to drive said driven member, or allow the latter to, rotate forwardly, and such that said backward preventing function may be cancelled by disengagement of certain of said friction elements, means for normally but yieldingly engaging sufficient of said friction elements to establish said backward preventing function of said operative connection in effect, and means whereby the operator may cause sufficient of said friction elements to disengage to cancel said backward preventing effect of said operative connection at will.

35. In a power transmission mechanism, in subcombination, a stationary member, a planetary gear mechanism including a rotatably mounted element thereof adapted to be established in stationary relation with said stationary member, a coaxial member, means including frictionally-engaging elements operable to connect said coaxial member stationary with said stationary member, a shiftable positive clutch member adapted movable into and out of one position in which said element of the planetary gear mechanism is coupled to said coaxial member and is in turn connected stationary with said stationary member through the medium of said means which include said friction elements aforesaid, and said clutch member adapted movable out of said one position in which said element of the planetary gear mechanism will be disconnected from said coaxial member and established directly in stationary relation with said stationary member whereby said frictionally-engaging elements may be disengaged without incurring a loosening of said element of the planetary gear mechanism from a stationary relation with said stationary member.

36. In a power transmission mechanism, the combination of a driving member, a driven member adapted for coupling to the load, a transmitting train in two-way operative connection with said driven member and including a variable speed planetary gear unit having a drive element for direct drive operative connection to said driving member and having a pivotal element adapted to be restrained from rotating in either direction whereby said planetary gear unit may be rendered functional to contribute to a continuity of two-way driving-connections of said transmitting train between said driving and driven members, means for restraining said pivotal element from rotating in either direction, means automatically operable in response to variations in the speed of said driving member to render a two-way direct drive operative connection between said driving member and the drive element aforesaid of the planetary gear unit, and means including one-way clutch mechanism in series in said transmitting train whereby said train is established operative between said driven and said driving member to utilize the two-way drive function of said planetary gear unit having its pivotal element restrained from rotating in either direction, to transmit forward rotative efforts from said driven member to said driving member while said speed responsively automatic means is inoperative between the element of said planetary gear unit and said driving member.

37. In a motor vehicle drive, in combination with the vehicle engine and a driven transmission member of said drive adapted for two-way drive operative connection with the driving wheels of said vehicle; of variable speed transmission means between said engine and driven member including frictionally-engaging elements provided with means normally but yieldingly engaging same and with means for the driver to cause their disengagement at will forming a normally functioning instrumentality in the completing of driving connections between said engine and driven member through said transmission means; speed responsively automatic means forming complementary means with said normally engaged friction elements for completing said driving connections through said transmission means between said engine and driven member which may be disestablished at the will of the driver by disengaging said normally engaged friction elements; and means including overrunning clutch mechanism in series in said transmission means forming complementary means with said normally engaged friction elements for rendering said transmission means operative to drive said engine in one direction under a manifestation of rotation by said driven member in one direction while said speed responsively automatic means is inoperative and which one-way drive function of said transmission means to drive said engine may be cancelled by disengagement of said normally engaged friction elements.

38. Variable speed power transmission mechanism comprising in combination a driving member, a driven member, variable speed transmission means between said members including a plurality of epicyclic gear trains arranged end to end, each having a driving element, an intermediate element and a driven element, a connection between the driven element of one train and the driving element of the next train of the plurality, and an operable individual connecting and disconnecting means between each of at least two elements both of one and the same end train of the plurality and the operatively contiguous one of said driving and driven members whereby, all elements of said one train may be disconnected from, or one, or more than one of said elements of said one train may be individually operatively connected to, said contiguous member, respectively, whereby said train may in complete disconnection from said contiguous member render a neutral, or in singular connection with said contiguous member render one driving ratio, or in multi-connection with said contiguous member render another driving ratio, all in connection with other of said plurality of epicyclic gear trains, in combination with a brake mechanism normally operable to render certain at least of said trains gear functional and including frictionally-engaging but disengageable brake elements, and centrifugally operated means carried by one of said members and train elements and adapted under certain conditions to automatically release said brake elements immediately prior to cumulative individual operative connections being established between a multiple of elements of a train of the plurality and said operatively contiguous member.

39. A variable speed power transmission comprising a driving member, a driven member, a planetary gear mechanism between and to give at least a low driving ratio and faster driving ratio between said members, a two-way rotation restraining brake mechanism normally in effect over said planetary gear mechanism rendering the latter two-way drive operative at its low speed ratio, means including firstly operable speed responsive automatic means for completing two-way drive operative connections of said low driving ratio between said members, and cumulatively operable means including successively operable speed responsive automatic means for completing other two-way drive operative connections between said members supplementively to those of said low driving ratio but whereby said brake mechanism will be released sufficiently to permit, and said planetary gear mechanism operatively converted to render, said faster driving ratio also in two-way drive capability.

40. In a power transmitting mechanism, power transmitting members including members giving two driving ratios between two of the members, one of said driving ratios when certain of said members giving said driving ratios is rendered a fixed axis element for other of said members and another of said driving ratios when certain of said members giving said driving ratios are locked together, means including frictionally-engaging brake elements for inducing said fixed axis function upon said certain member, means normally but yieldingly operative to engage said brake elements, centrifugally operable automatic clutch elements carried by one of said members and adapted to lock said certain members together, and an operative connection between the centrifugally operated element of said clutch and certain of said brake elements whereby initial function of the centrifugally operated clutch element will be to actuate said brake elements out of engagement such that said fixed axis function inducement over said certain member will be released sufficiently before said clutch functions to lock said certain members together to change the driving ratio.

41. In a power transmission mechanism, power transmitting members including driving and driven members and intermediary transmitting members including members making up a planetary gear unit, a pivotal element of said gear unit, brake means for restraining said pivotal element from rotating, a primary centrifugal automatic clutch mechanism responsive to the speed of said driving member for coupling a first of said intermediary transmitting members to said driving member, a centrifugal actuator mechanism adapted to normally stand at rest but in association with said brake means, said actuator mechanism adapted to be engaged and excited to rotate by said primary centrifugal clutch mechanism, means of the latter for engaging and exciting said actuator to rotate as a secondary centrifugally actuated function of said clutch mechanism, and means whereby said actuator, in response to a sufficient speed of said excited rotation will operate to release said brake means.

42. A power transmission mechanism including power transmitting members certain of which forming a planetary gear unit, with a brake device cooperating with said gear unit and including engageable and disengageable elements provided with resilient means normally engaging same, and a clutch device automatically operable in response to variations in the speed of one of said members to open and close forming automatic means substantially concurrently operative to actuate said brake elements out of engagement and to bring the elements of said gear unit into an interlocked state both functions incident to said clutch operating to close, and forming means automatically operative to disestablish said interlocked state of said gear unit elements and to reestablish said brake elements in engagement concurrently incident to said clutch operating to open.

43. A multi-speed power transmission mechanism including driving and driven members with variable speed transmission means between said members including a planetary gearing mechanism and having a brake mechanism including engageable and disengageable frictionally-engaging elements operable to normally apply a brake effect upon certain of the elements of the planetary gear mechanism whereby the latter will be rendered two-way drive gear functional, having means for completing driving connections between said members complementary to the effect of said brake mechanism to render said planetary gearing operative at one driving ratio, and having a centrifugally automatically operable device carried by, and responsive to the speed of, certain revolvable of the members aforesaid and elements of said transmission mechanism and in control operative connection with said brake mechanism whereby under certain conditions, including sufficient speed operation of said device, said frictionally-engaging brake elements will be actuated out of engagement by the centrifugal efforts of said device and such that as a sequence said device will centrifugally automatically culminate supplementary driving connection complementary to said first completed driving connections between said members and such that will render said planetary gearing operative at another driving ratio.

44. In a power transmission mechanism, a driving member, a planetary gear mechanism arranged as a variable speed transmission unit to be driven from said driving member, a first train of driving connections to reach said planetary gear mechanism from said driving member through a certain member of said planetary gear mechanism and including a friction clutch individual to said first train, a pivotal element of said planetary gear mechanism adapted to be restrained from rotating to render said gear mechanism gear functional, a second train of driving connections operable to reach said planetary gear mechanism from said driving member through another member of said planetary gear mechanism, a stationary member, brake means including engageable and disengageable elements, respectively, to apply and release said brake and operable to reach said pivotal element through a portion of said second train of operable driving connections, means normally but yieldingly operative to engage said brake elements, a clutch individual to and in series in said second train of operable driving connections for completing the operating connections of said second train between said driving member and planetary gear mechanism, means actuatable incidental to certain elements of said last-mentioned clutch being motivated toward engagement forming means thereby operable to disengage said brake elements, and means for motivating certain elements of said last-mentioned clutch toward engagement such that same will reach an effective clutch-packed state of engagement only after said means actuatable thereby to disengage said brake elements has been actuated sufficiently to accomplish said disengagement.

45. In a motor vehicle drive, a planetary gear mechanism including an element adapted to be restrained from rotating, brake mechanism including frictionally-engaging elements rendering said restraint, means incorporating said planetary gear mechanism therein for transmitting rotative efforts between the vehicle engine and the driving wheels of said vehicle, a rotatably mounted member in operated connection with said means, a distinct system of engageable and disengageable elements certain of which being rotatable with said rotatably mounted member, means automatically operable in response to variations in the speed of said rotatably mounted member to motivate certain of said distinct system of elements to engage or disengage other of the same system of elements, and the thus motivatable of said elements forming means in operative connection with and to accomplish the release of said brake mechanism by the same manifestation of said speed responsive automatically operable means as accomplishes the engagement of said distinct system of elements.

46. In a motor vehicle drive, the combination with a driving member driven by the vehicle engine, a driven member for propelling said vehicle, transmitting means between said members including intermediary transmitting members and a planetary gear mechanism in series therein and provided with a brake device rendering said gear mechanism two-way gear drive at a reduced speed ratio, means for completing initial driving connections between said driving and driven members complementary to said brake holding said gear mechanism two-way gear drive, and means centrifugally automatically operable in response to a progression of speed by one of said members to release said brake device under conditions of sustained torque flow through said transmitting means from said driving member to said driven member and to culminate in completing driving connections between said driving and driven members whereby said gear mechanism will contribute to transmission of rotative efforts in either direction at a faster speed ratio.

47. A power transmitting mechanism including a driving member representing a power source and a driven member representing a load propelling member with variable speed transmission means between said members; having means including a normally engaged but optionally disengageable system of friction-engaging elements under control of the operator and a centrifugally automatically operable clutch embodiment of other frictionally-engaging elements both required jointly operative in the establishment of power transmitting connections through said transmission means from said driving to said driven member that may be disestablished at any time by disengagement of said normally engaged elements at the will of the driver over the influence of said centrifugal clutch remaining engaged; and means including a one-way clutch coordinating said transmission means for driving said driving member in one direction under the influence of the load residing in said driven member while said centrifugal clutch is disengaged and depending upon joint operation of said normally engaged elements to render said one-way driving connections operative from said driven member to said driving member, and said normally engaged elements coordinated with said transmission means and members whereby its joint operation is required with that of said one-way clutch to complete said one-way driving connection from said driven to said driving member and whereby said connections also may be disestablished by disengagement of said normally engaged elements at the will of the driver over the tendency of said one-way clutch.

48. In a power transmission, the combination of a driving member, a driven member, variable speed transmission means between said driving and driven members including a multi-speed gearset in series therein, means including a one-way clutch mechanism operable under the influence of forward rotative efforts emanating in said driven member to render certain elements of said gearset operable to in turn transmit said forward rotative efforts from said driven member toward said driving member, and means for giving transmission continuity from said certain elements of said gearset for said forward rotative efforts emanating in said driven member to reach said driving member drivingly in the same direction including another one-way clutch mechanism forming means of said transmission continuity to said driving member permitting the latter to overrun in the same direction.

49. The invention claimed in claim 48, together with means including a system of frictionally-engaging elements adapted to be normally but yieldingly engaged forming mechanism for dependency upon by said one-way clutches and said gearing for any transmission function of said forward rotative efforts emanating in said driven member to said driving member contributed to by said one-way clutches and forming friction means adapted for disengagement at the will of the operator to render such driving connections neutral under conditions of the load torque of said driven member manifesting itself in effecting a torque strained drive between said driven member and said driving member.

50. In a power transmitting mechanism, the combination of a first system of engageable and disengageable elements, automatic means for normally establishing said elements in one of their engaged and disengaged states, a system of centrifugally automatically operable mechanism associated with said system of engageable and disengageable elements for disestablishing said elements from their said normally established state and for establishing same in the other of their said engaged or disengaged states, and another system of centrifugally automatically operable mechanism adapted to frictionally engage said first-mentioned system of centrifugally automatically operable mechanism forming the sole means whereby said first-mentioned system of centrifugally automatically operable mechanism may be rotated up to a speed sufficient to exercise its own said centrifugal function over said system of engageable and disengageable elements.

51. In a change speed transmission, the combination of a driving member, a driven member, automatically variable change speed transmission mechanism for progressively changing the gear between said driving and driven members from a positive two-way drive given speed ratio to a positive two-way drive faster speed ratio including planetary gearing differentially operable either to give said given speed gear ratio or said faster speed ratio, a resilient means normally applied friction brake mechanism for giving positive two-way reactance to said planetary gearing in the rendering of said given speed gear ratio, and centrifugally automatically operable means for establishing said faster speed ratio two-way drive effective between said driving and driven members operable to progressively automatically actuate the release of said brake mechanism and establish said faster speed ratio.

52. In a power transmitting mechanism which includes gearing establishable to give different speed ratios, the combination of resilient means normally engaged elements for normally establishing said gearing operable at certain speed ratio, revolvable means carrying centrifugal weights forming means adapted to be frictionally engaged to rotate sufficiently to exercise its centrifugal forces and forming means whose said centrifugal forces are adapted to effect the disengagement of said normally engaged elements, and other revolvable means carrying centrifugal weights forming means whose respective centrifugal forces are adapted to cause frictional engagement of their respective carrying said revolvable means with said first-named revolvable means thereby to promote said sufficient rotation.

53. In a power transmitting mechanism, the combination of power transmitting members including members for giving different speed ratios between two of said members, a system of engageable and disengageable elements provided with means for automatically but yieldingly engaging same and forming means adapted to render said different speed members initially operable at a low speed ratio, and means automatically operable in response to gradually increasing speed of rotation of one of said members to first cause disengagement of said system of elements and then establish a faster speed ratio between said two members through the medium of said different speed members.

EVERETT R. BURTNETT.